US011489444B2

(12) United States Patent
Botti (10) Patent No.: US 11,489,444 B2
(45) Date of Patent: Nov. 1, 2022

(54) SWITCHING CONVERTER AND METHOD

(71) Applicant: STMicroelectronics S.r.l., Agrate Brianza (IT)

(72) Inventor: Edoardo Botti, Vigevano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 51 days.

(21) Appl. No.: 17/202,592

(22) Filed: Mar. 16, 2021

(65) Prior Publication Data
US 2021/0296988 A1    Sep. 23, 2021

(30) Foreign Application Priority Data

Mar. 20, 2020   (IT) .......................... 102020000005971

(51) Int. Cl.
   *H02M 3/335*   (2006.01)
   *H02M 3/158*   (2006.01)
(52) U.S. Cl.
   CPC .................................. *H02M 3/158* (2013.01)
(58) Field of Classification Search
   CPC ... H02M 3/158; H02M 1/0054; H02M 3/1557
   See application file for complete search history.

(56) References Cited

U.S. PATENT DOCUMENTS 10,523,197 B2   12/2019  Botti et al.
10,749,474 B2    8/2020  Botti et al.
2015/0109055 A1*  4/2015 Botti ...................... H03F 1/0205
                                                     330/251
2015/0115926 A1*  4/2015 Song ....................... H02M 1/14
                                                     323/290

OTHER PUBLICATIONS

Kim, et al., "Design of bidirectional PWM Sepic/Zeta DC-DC converter," Power Electronics, 2007 7th International Conference On, IEEE, XP031367136, Piscataway, NJ, USA, Oct. 22, 2007, pp. 614-619.
Kim, et al., "New Bidirectional ZVS PWM Sepic/Zeta DC-DC Converter," Industrial Electronics, 2007 IEEE International Symposium On, IEEE, PI, XP031156192, Jun. 1, 2007, pp. 555-560.

* cited by examiner

*Primary Examiner* — Adolf D Berhane
*Assistant Examiner* — Afework S Demisse
(74) *Attorney, Agent, or Firm* — Slater Matsil, LLP (57) ABSTRACT

An embodiment switching converter comprises an input stage; an output stage for providing an output voltage; a capacitive coupling stage for coupling the input stage to the output stage; a first switching stage configured to switch between a first state where an input voltage is provided to the input stage, and a second state where the input voltage is not provided to the input stage; a second switching stage configured to switch between a first state in which a reference voltage is provided to the output stage, and a second state in which the reference voltage is not provided to the output stage; and a voltage regulation stage configured to set, after the second switching stage switches from the first state to the second state and before the first switching stage switches from the second state to the first state, a target voltage across the input stage.

23 Claims, 2 Drawing Sheets

Figure 1

SWITCHING CONVERTER AND METHOD

CROSS-REFERENCE TO RELATED APPLICATIONS

This application claims the benefit of Italian Application No. 102020000005971, filed on Mar. 20, 2020, which application is hereby incorporated herein by reference.

TECHNICAL FIELD

Embodiments of the present invention generally relate to the field of switching converters and methods. Particularly, embodiments of the present invention relate to DC-DC switching converters and methods for converting a direct current input voltage into a direct current output voltage different from the input voltage. More particularly, embodiments of the present invention relate to a switching converter, such as a zeta converter, and method, wherein the output voltage is lower or higher than the input voltage depending on a duty cycle of an oscillating signal.

BACKGROUND

Direct current-direct current (DC-DC) switching converters may be used in any electronic system comprising a power source (such as a battery) and one or more electronic/electro-mechanic components each one operating at a respective voltage: in such an electronic system the DC-DC switching converter may be configured to generate multiple controlled output voltages from the (single) input voltage provided by the power source.

This allows saving space, in that the use of multiple power sources within the electronic system to supply different components thereof is avoided.

Recently, zeta converters have been developed, in which the output voltage is lower or higher than the input voltage depending on a duty cycle of an oscillating signal (typically, a square-wave signal).

A conventional zeta converter comprises an inductive (or inductive-capacitive) input stage for receiving the input voltage, an inductive (or inductive-capacitive) output stage for providing the output voltage, a capacitive coupling stage for coupling the input stage and the output stage to each other, a high-side switch and a low-side switch.

Under the control of the oscillating signal, the high-side switch is configured to be switched between first (or ON) and second (or OFF) states in which the input voltage is delivered and prevented from being delivered, respectively, to the input stage, and the low-side switch is configured to be switched between first (or ON) and second (or OFF) states in which a reference voltage is delivered and prevented from being delivered, respectively, to the output stage.

SUMMARY

The Applicant has understood that the conventional zeta converter is not satisfactory for modern technological requirements, and particularly for applications wherein high efficiency is required.

In fact, the Applicant has recognized that the maximum working currents flowing through the high-side and low-side switches are extremely high compared to an output current delivered to an electric load coupled to (the output stage of) the zeta converter, that the maximum working voltage across the output stage is significantly higher than the output voltage, and that the minimum working voltage across the input stage is extremely far from the output voltage: this results in very high commutation losses, especially at high switching frequencies of the zeta converter.

The Applicant has understood that criticalities in the commutation losses arise when the duty cycle of the oscillating signal is higher than 0.5 (boost condition), and when the low-side switch is switched from the ON state to the OFF state and the high-side switch is subsequently switched from the OFF state to the ON state: in this case, the high-side switch experiences an initial voltage drop and a current flow that, based on current electrical sizing, may be higher than 30V and higher than 10 A, which results in an initial power dissipation higher than 300 W.

Moreover, when, as in practical cases, the high-side switch is implemented through a metal-oxide-semiconductor (MOS) transistor, the intrinsic diode between drain and source terminals of the MOS transistor is, at least initially, in direct conduction: therefore, due to reverse recovery time, the current through the high-side switch may even be higher, which results in an initial power dissipation that may be even higher than 500 W.

The Applicant has faced the above mentioned issues, and has devised a switching converter comprising a voltage regulation stage configured to set, after the low-side switching stage is switched from the ON state to the OFF state, and before the high-side switching stage is switched from the OFF state to the ON state, a target voltage across the input stage, with essentially no power dissipation (i.e., through one or more components of the voltage regulation stage featuring no, or essentially no, power dissipation).

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a switching converter for converting a direct current input voltage into a direct current output voltage.

According to an embodiment, the switching converter comprises:
an input stage for receiving the input voltage;
an output stage for providing the output voltage;
a capacitive coupling stage for coupling the input stage and the output stage to each other;
a first switching stage configured to be switched between a first state in which the input voltage is allowed to be provided to the input stage, and a second state in which the input voltage is prevented from being provided to the input stage;
a second switching stage configured to be switched between a first state in which a reference voltage is allowed to be provided to the output stage, and a second state in which the reference voltage is prevented from being provided to the output stage;
a voltage regulation stage configured to set, after the second switching stage is switched from the first state to the second state and before the first switching stage is switched from the second state to the first state, a target voltage across the input stage.

According to an embodiment, whose features are additional or alternative to any of the features of the previous embodiments, the voltage regulation stage comprises an LC stage.

According to an embodiment, whose features are additional or alternative to any of the features of the previous embodiments, the voltage regulation stage comprises a third switching stage configured to be switched between a first state in which the target voltage is allowed to be set across the input stage through the LC stage, and a second state in which the target voltage is prevented from being set across the input stage.

According to an embodiment, whose features are additional or alternative to any of the features of the previous embodiments, the voltage regulation stage comprises a control module configured to:

with the first switching stage in the second state, switch the third switching stage from the second state to the first state when the second switching stage is switched from the first state to the second state, switch the third switching stage from the first state back to the second state when the target voltage across the input stage has been set, and with the second switching stage in the second state, switch the first switching stage from the second state to the first state when the third switching stage is switched from the first state back to the second state.

According to an embodiment, whose features are additional or alternative to any of the features of the previous embodiments, when the third switching stage is in the first state, the LC stage is connected in parallel to the input stage.

According to an embodiment, whose features are additional or alternative to any of the features of the previous embodiments, the switching device further comprises at least one limiting stage for limiting oscillations across the LC stage.

According to an embodiment, whose features are additional or alternative to any of the features of the previous embodiments, the at least one limiting stage comprises, across the first switching stage and the third switching stage, a diode element for limiting positive oscillations across the LC stage.

According to an embodiment, whose features are additional or alternative to any of the features of the previous embodiments, the at least one limiting stage further comprises:

across the LC stage, a fourth switching stage for limiting negative oscillations across the LC stage.

According to an embodiment, whose features are additional or alternative to any of the features of the previous embodiments, when the third switching stage is in the first state, the LC stage is connected in parallel to the output stage.

According to an embodiment, whose features are additional or alternative to any of the features of the previous embodiments, the switching converter is a zeta converter.

Another aspect of the present invention relates to a system comprising one or more of such switching converter.

A further aspect of the present invention relates to a method for converting, in a switching converter, a direct current input voltage into a direct current output voltage. The switching converter comprises:

an input stage for receiving the input voltage;

an output stage for providing the output voltage;

a capacitive coupling stage for coupling the input stage and the output stage to each other;

a first switching stage configured to be switched between a first state in which the input voltage is allowed to be provided to the input stage, and a second state in which the input voltage is prevented from being provided to the input stage, and a second switching stage configured to be switched between a first state in which a reference voltage is allowed to be provided to the output stage, and a second state in which the reference voltage is prevented from being provided to the output stage.

According to an embodiment, the method comprises: switching the second switching stage from the first state to the second state (the first switching state being in the second state), setting a target voltage across the input stage, and then switching the first switching stage from the second state to the first state (the second switching stage being at the second state).

BRIEF DESCRIPTION OF THE DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF ILLUSTRATIVE EMBODIMENTS

Figure 1:
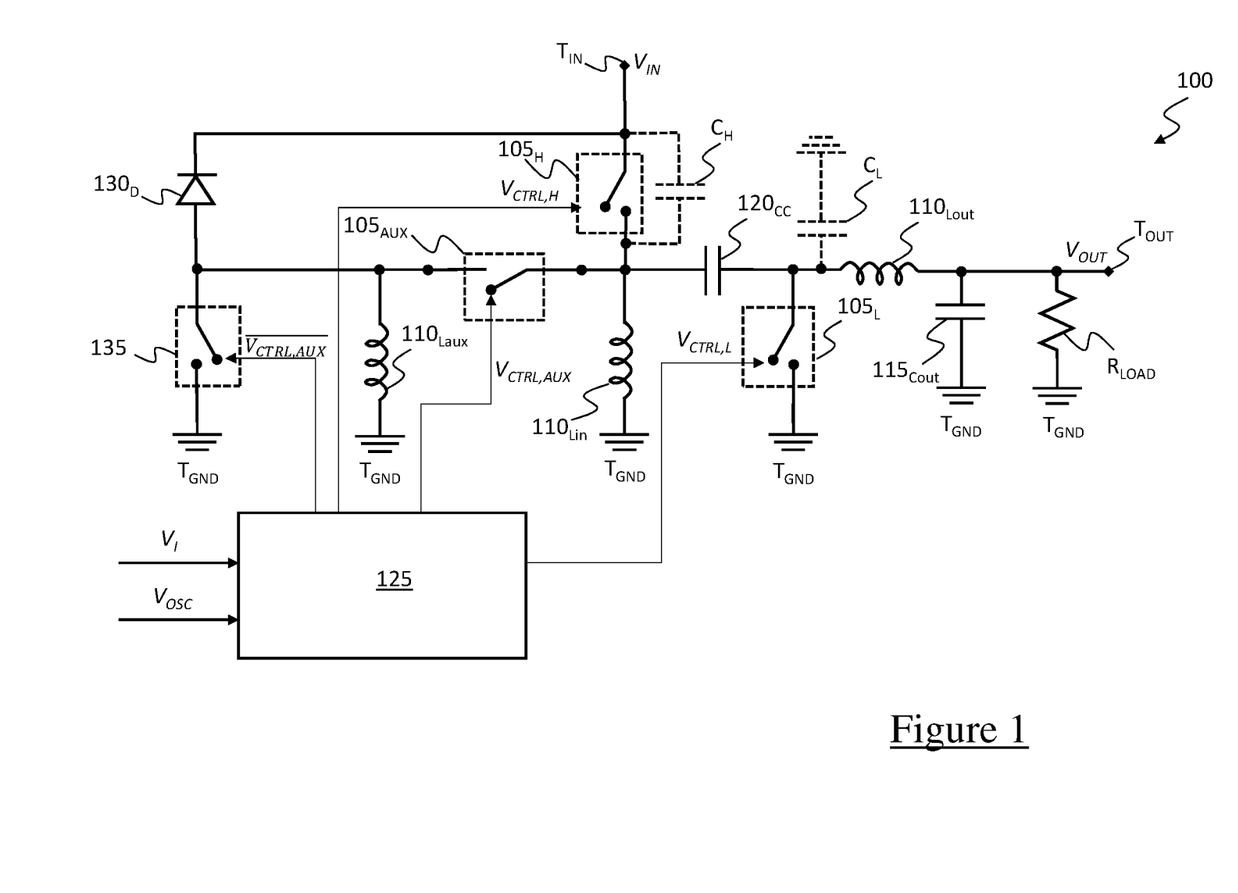
FIG. 1 shows a schematic circuit diagram of a switching converter according to an embodiment of the present invention.

With reference to the drawings, FIG. 1 shows a schematic circuit diagram of a switching converter 100 according to an embodiment of the present invention.

In the following, when one or more features of the switching converter 100 are introduced by the wording "according to an embodiment", they are to be construed as features additional or alternative to any features previously introduced, unless otherwise indicated and/or unless evident incompatibility among feature combinations.

According to an embodiment, the switching converter 100 is a DC-DC switching converter, i.e. a switching converter configured to convert a direct current (DC) input voltage $V_{IN}$ into a direct current (DC) output voltage $V_{OUT}$ (the output voltage $V_{OUT}$ being different from the input voltage $V_{IN}$).

According to an embodiment, the switching converter is a Zeta converter, i.e. a switching converter wherein the output voltage $V_{OUT}$ is lower or higher than the input voltage $V_{IN}$ depending on a duty cycle of an oscillating signal $V_{OSC}$ (discussed in the following).

Without losing generality, the switching converter 100 may be used in any electronic system comprising a power source (such as a battery tank of photovoltaic cells) and one or more electronic/electro-mechanic components each one operating at a respective voltage: in such an electronic system the switching converter 100 (or more thereof) may be configured to generate multiple controlled output voltages from a single input voltage provided by the power source (thus saving space, in that the use of multiple power sources within the electronic system to supply different components thereof is avoided). Examples of such an electronic system include a battery charger or an audio power amplifier.

According to an embodiment, the switching converter 100 comprises an input terminal $T_{IN}$ providing the input voltage $V_{IN}$, and an output terminal $T_{OUT}$ providing the output voltage $V_{OUT}$.

According to an embodiment, the switching converter 100 comprises a first switching stage (for example, a first switching element) $105_H$, hereinafter referred to as high-side switch, and a second switching stage (for example, a second switching element) $105_L$, hereinafter referred to as low-side switch. In the following, the high-side switch $105_H$ and the low-side switch $105_L$ will be also concisely denoted by switches $105_H$, $105_L$, when distinguishing between the high-side switch $105_H$ and the low-side switch $105_L$ is not relevant for the understanding of the present invention.

The switches $105_H$, $105_L$ are illustrated in the figure by same, generic representations, in that their specific implementations are not relevant for the understanding of the present invention.

According to an embodiment, each switch $105_H$, $105_L$ comprises a control terminal for receiving a respective control signal $V_{CTRL,H}$, $V_{CTRL,L}$, and first and second terminals electrically coupleable to each other according to a value of (i.e., taken by) the respective control signal $V_{CTRL,H}$, $V_{CTRL,L}$.

According to an embodiment, each control signal $V_{CTRL,H}$, $V_{CTRL,L}$ is a digital signal, i.e. a signal that may take a low logic level (for example corresponding to a reference or ground voltage, such as 0 V) and a high logic level (for example, corresponding to a positive voltage higher than the reference voltage, such as 3.4 V).

According to an embodiment, each control signal $V_{CTRL,H}$, $V_{CTRL,L}$ is provided (e.g., generated) from the oscillating signal $V_{OSC}$.

According to an embodiment, the oscillating signal $V_{OSC}$ is a square-wave signal with duty cycle D. According to an embodiment, the duty cycle D of the oscillating signal $V_{OSC}$ is dynamically variable so as to accordingly vary a conversion factor ($V_{OUT}/V_{IN}$) of the switching converter 100.

According to an embodiment, depending on the value of the respective control signal $V_{CTRL,H}$, $V_{CTRL,L}$, each switch $105_H$, $105_L$ may take a closed or ON state in which the respective first and second terminals are electrically coupled to each other (thus allowing an electric current to flow across the switch $105_H$, $105_L$), and an open or OFF state in which the respective first and second terminals are electrically decoupled to each other (thus preventing any electric current to flow across the switch $105_H$, $105_L$).

According to an embodiment, the control signals $V_{CTRL,H}$, $V_{CTRL,L}$ are designed in such a way that the switches $105_H$, $105_L$ are not both in the ON state: however, as better discussed in the following, unlike a typical, known zeta converter in which the control signals $V_{CTRL,H}$, $V_{CTRL,L}$ are mutually inverted square-wave signals, i.e. square-wave signals fixedly phase shifted by 180° to each other (typically, one of the control signals $V_{CTRL,H}$, $V_{CTRL,L}$ is the oscillating signal $V_{OSC}$, and the other one of the control signals $V_{CTRL,H}$, $V_{CTRL,L}$ is a negated version of the oscillating signal $V_{OSC}$), the control signals $V_{CTRL,H}$, $V_{CTRL,L}$, according to the present invention are square-wave signals dynamically phase shifted to each other (i.e., they have no fixed, predetermined phase shifting to each other).

According to an embodiment, the first terminal of the high-side switch $105_H$ is electrically coupled (e.g., directly connected) to the input terminal $T_{IN}$.

According to an embodiment, the second terminal of the low-side switch $105_L$ is electrically coupled (e.g., directly connected) to a reference terminal $T_{GND}$ providing the reference voltage (for example, 0 V).

According to an embodiment, not shown, the high-side switch $105_H$ comprises a PMOS transistor, and the low-side switch $105_L$ comprises a NMOS transistor.

According to an embodiment, the switching converter 100 comprises an input stage for receiving the input voltage $V_{IN}$ (from the input terminal $T_{IN}$) and an output stage for providing the output voltage $V_{OUT}$ (to the output terminal $T_{OUT}$).

According to an embodiment, the input stage of the switching converter 100 is an inductive input stage, the input stage of the switching converter 100 for example comprising an inductor element $110_{Lin}$ (hereinafter referred to as input inductor).

According to an embodiment, the input inductor 110 has a first terminal electrically coupled (e.g., directly connected) to the second terminal of the high-side switch $105_H$, and a second terminal electrically coupled (e.g., directly connected) to the reference terminal $T_{GND}$.

According to an embodiment, the output stage of the switching converter 100 comprises an inductor element $110_{Lout}$, hereinafter referred to as output inductor.

According to an embodiment, the output inductor $110_{Lout}$ has a first terminal electrically coupled (e.g., directly connected) to the first terminal of the low-side switch $105_L$, and a second terminal electrically coupled (e.g., directly connected) to the output terminal $T_{OUT}$.

Therefore, in the exemplary considered embodiment, with the high-side switch $105_H$ in the ON state the input voltage $V_{IN}$ is allowed to be provided to the input stage, and with the high-side switch $105_H$ in the OFF state the input voltage $V_{IN}$ is prevented from being provided to the input stage.

According to an embodiment, the output stage of the switching converter 100 comprises a capacitor element $115_{Cout}$, hereinafter referred to as output capacitor.

According to an embodiment, the output capacitor $115_{Cont}$ has a first terminal electrically coupled (e.g., directly connected) to the output terminal $T_{OUT}$ (and, hence, to the second terminal of the output inductor $110_{Lout}$) and a second terminal electrically coupled (e.g., directly connected) to the reference terminal $T_{GND}$.

Therefore, in the exemplary considered embodiment, with the low-side switch $105_L$ in the ON state the reference voltage is allowed to be provided to the output stage, and with the low-side switch $105_L$ in the OFF state the reference voltage is prevented from being provided to the output stage.

According to an embodiment, the switching converter 100 comprises a capacitive coupling stage for coupling the input stage and the output stage to each other.

According to an embodiment, the capacitive coupling stage comprises a capacitor element $120_{CC}$, hereinafter referred to as coupling capacitor.

According to an embodiment, the coupling capacitor $120_{CC}$ has a first terminal electrically coupled (e.g., directly connected) to the first terminal of the input inductor $110_{Lin}$ (and, hence, to the second terminal of the high-side switch $105_H$), and a second terminal electrically coupled (e.g., directly connected) to the first terminal of the output inductor $110_{Lout}$ (and, hence, to the first terminal of the low-side switch $105_L$).

As mentioned above, the switching converter 100 may be used in any electronic system. According to an embodiment, the switching converter 100 is configured to be electrically coupled to one or more modules of such an electronic system. Such modules are conceptually represented in the figure by an equivalent resistor element $R_{LOAD}$, hereinafter referred to as load resistor, having a first terminal electrically coupled (e.g., directly connected) to the output terminal $T_{OUT}$ of the switching converter 100 and a second terminal electrically coupled (e.g., directly connected) to the reference terminal $T_{GND}$.

The switching converter so far disclosed may essentially be regarded as a typical, known zeta converter, whose basic relationships are cited here below (and are valid yet for the switching converter according to embodiments of the present invention):

the output voltage $V_{OUT}$ as a function of the input voltage $V_{IN}$ may be expressed by the following relationship:

$$V_{OUT} = V_{IN} \frac{D}{1-D}$$

the maximum working voltage $V_{O,max}$ at the first terminal of the output inductor $110_{Lout}$ (high-side switch $105_H$ in the ON state, low-side switch $105_L$ in the OFF state), and the minimum working voltage $V_{O,min}$ at the first terminal of the output inductor $110_{Lout}$ (high-side switch $105_H$ in the OFF state, low-side switch $105_L$ in the ON state), may be expressed by the following relationships:

$$V_{O,max} = \frac{V_{OUT}}{D} = \frac{V_{IN}}{1-D}$$

$$V_{O,min} = 0$$

the maximum working voltage $V_{I,max}$ at the first terminal of the input inductor $110_{Lin}$ (high-side switch $105_H$ in the ON state, low-side switch $105_L$ in the OFF state), and the minimum working voltage $V_{I,min}$ at the first terminal of the input inductor $110_{Lin}$ (high-side switch $105_H$ in the OFF state, low-side switch $105_L$ in the ON state) may be expressed by the following relationships:

$$V_{I,max} = V_{IN}$$

$$V_{I,min} = V_{IN} - V_{O,max} = V_{IN} - \frac{V_{IN}}{1-D}$$

the output current $I_{OUT}$ through the load resistor $R_{LOAD}$ may be expressed by the following relationship:

$$I_{OUT} = \frac{V_{OUT}}{R_{load}} = \frac{V_{IN}}{R_{load}} \frac{D}{1-D}$$

wherein $R_{load}$ denotes the resistance value of the load resistor $R_{LOAD}$;

the average $I_{L,avg}$ and maximum $I_{L,max}$ working currents flowing through the low-side switch $105_L$ may be expressed by the following relationships:

$$I_{L,avg} = -\frac{I_{OUT}}{1-D}(1-D) = -I_{OUT}$$

$$I_{L,max} = -\frac{I_{OUT}}{1-D}$$

the average $I_{H,avg}$ and maximum $I_{H,working}$ currents flowing through the high-side switch $105_H$ may be expressed by the following relationships:

$$I_{H,avg} = I_{OUT} \frac{D}{1-D}$$

$$I_{H,max} = \frac{I_{OUT}}{1-D}$$

The Applicant has recognized that the known zeta converter, whose main relationships are cited above, has a low efficiency.

Indeed, considering, just as an example:

$V_{IN}$=10V

D=0.7

$R_{LOAD}$=1Ω, it follows that, based on the above-cited relationships:

$V_{OUT}$=23.3V $V_{O,max}$=32.86 V $V_{I,min}$=−22.86 V $I_{OUT}$=2.33 A $I_{H,max}$=$I_{L,max}$=10.95 A i.e. the maximum working currents $I_{H,max}$, $I_{L,max}$ flowing through the switches $105_H$, $105_L$ are extremely high compared to the output current $I_{OUT}$, the maximum working voltage $V_{O,max}$ is significantly higher than the output voltage $V_{OUT}$, and the minimum working voltage $V_{I,min}$ is extremely far from the output voltage $V_{OUT}$: this results in very high commutation losses, especially at high switching frequencies.

The Applicant has understood that criticalities in the commutation losses arise when D>0.5 (boost condition), and when the low-side switch $105_L$ is switched from the ON state to the OFF state and the high-side switch $105_H$ is subsequently switched from the OFF state to the ON state: in this case, the first terminal of the output inductor $110_{Lout}$ experiences a sudden voltage excursion from the minimum working voltage $V_{O,min}$ to the maximum working voltage $V_{O,max}$ (32.86 V in the example at issue), and the high-side switch $105_H$ experiences an initial voltage drop of 32.86 V across it (i.e., $V_{IN}-(V_{IN}-V_{O,max})=V_{O,max}$) and an initial power dissipation of 359.8 W (32.86 V*10.95 A).

Moreover, when, as in practical cases, the high-side switch $105_H$ is implemented through a MOS transistor, the intrinsic diode between drain and source terminals of the MOS transistor is, at least initially, in direct conduction: therefore, due to reverse recovery time, the current through the high-side switch $105_H$ may also be 2 or 3 times higher than the maximum working current $I_{H,max}$ (thus resulting in an initial power dissipation that may raise above 500 W).

An embodiment switching converter 100 according to the present invention is aimed at overcoming, or at least strongly reducing, such issues, as discussed here below.

According to the principles of the present invention, the switching converter 100 comprises a voltage regulation stage configured to set, after the low-side switch $105_L$ is switched from the ON state to the OFF state and before the high-side switch $105_H$ is switched from the OFF state to the ON state, a target voltage $V_{I,TH}$ across the input inductor $110_{Lin}$.

According to an embodiment, the voltage regulation stage comprises an inductive-capacitive (LC) stage.

According to an embodiment, the voltage regulation stage comprises an auxiliary switching stage configured to be switched between a closed or ON state in which the target voltage $V_{I,TH}$ is allowed to be set across the input inductor $110_{Lin}$ through the LC stage, and an open or OFF state in which the target voltage $V_{I,TH}$ is prevented from being set across the input inductor $110_{Lin}$.

According to an embodiment, the LC stage comprises an auxiliary inductor element $110_{Laux}$, hereinafter referred to as auxiliary inductor.

According to an embodiment, the auxiliary inductor $110_{Laux}$ has a first terminal electrically coupled (e.g., directly connected) to the second terminal of the auxiliary switching element $105_{AUX}$, and a second terminal electrically coupled (e.g., directly connected) to the reference terminal $T_{GND}$.

According to an embodiment, the capacitive effect of the LC stage is due to parasitic capacitors $C_H$, $C_L$ associated with the first and second terminals of the coupling capacitor $C_C$, the parasitic capacitors essentially comprising the intrinsic capacitor of the high-side switch $105_H$ and the intrinsic capacitor of the low-side switch $105_L$.

According to an embodiment, the auxiliary switching stage comprises an auxiliary switching element $105_{AUX}$, hereinafter referred to as auxiliary switch. According to an embodiment, the auxiliary switch $105_{AUX}$ has a first terminal electrically coupled (e.g., directly connected) to the first terminal of the input inductor $110_{Lin}$ (and, hence, to the second terminal of the high-side switch $105_H$), a second terminal, and a control terminal for receiving a respective control signal $V_{CTRL,AUX}$.

According to an embodiment, the auxiliary switch $105_{AUX}$ comprises a bilateral switch (also referred to as analogue or PETR switch).

According to embodiments, not shown, the auxiliary switch $105_{AUX}$ and the auxiliary inductor $110_{Laux}$ are electrically coupled to each other in reverse order (i.e., with the first terminal of the auxiliary inductor $110_{Laux}$ that is electrically coupled (e.g., directly connected) to the first terminal of the input inductor $110_{Lin}$, with the second terminal of the auxiliary switch $105_{AUX}$ that that is electrically coupled (e.g., directly connected) to the reference terminal $T_{GND}$, and with the second terminal of the auxiliary inductor $110_{Laux}$ and the first terminal of the auxiliary switch $105_{AUX}$ that are electrically coupled (e.g., directly connected) to each other).

Similarly to the switches $105_H$, $105_L$, the first and second terminals of the auxiliary switch $105_{AUX}$ are electrically coupleable to each other according to a value of the control signal $V_{CTRL,AUX}$.

According to an embodiment, depending on the value of the control signal $V_{CTRL,AUX}$, the auxiliary switch $105_{AUX}$ may take the ON state, in which the respective first and second terminals are electrically coupled to each other (thus allowing an electric current to flow across the auxiliary switch $105_{AUX}$ and, hence, the target voltage $V_{I,TH}$ to be set across the input inductor $110_{Lin}$ through the LC stage), or the OFF state, in which the respective first and second terminals are electrically decoupled to each other (thus preventing any electric current from flowing across the auxiliary switch $105_{AUX}$ and, hence, the target $V_{I,TH}$ voltage from being set across the input inductor $110_{Lin}$).

According to an embodiment, the control signal $V_{CTRL,AUX}$ is a digital signal, i.e. a signal that may take a low logic level (for example, corresponding to the reference or ground voltage) or a high logic level (for example, corresponding to a positive voltage higher than the reference voltage, such as 3.4 V).

According to an embodiment, the control signal $V_{CTRL,AUX}$ is provided (e.g., generated) from the oscillating signal $V_{OSC}$.

According to the exemplary considered embodiment, when the auxiliary switch $105_{AUX}$ is in the ON state, the LC stage (particularly, the auxiliary inductor $110_{Laux}$) is connected in parallel to the input stage (particularly, the input inductor $110_{Lin}$).

According to the exemplary considered embodiment, the auxiliary switch $105_{AUX}$ and the LC stage (particularly, the auxiliary inductor $110_{Laux}$) are connected in series to each other, and in parallel to the input stage (particularly, the input inductor $110_{Lin}$).

According to an alternative embodiment, not shown, the auxiliary switch $105_{AUX}$ and the LC stage (particularly, the auxiliary inductor $110_{Laux}$) are connected in series to each other, and across high-side switch $105_H$ and the coupling capacitor $120_{CC}$ (for example, with the first and second terminals of the auxiliary switch $105_{AUX}$ electrically coupled to the first terminal of the high-side switch $105_H$ and to the first terminal of the auxiliary inductor $110_{Laux}$, and with the second terminal of the auxiliary inductor $110_{Laux}$ electrically coupled to the second terminal of the coupling capacitor $120_{CC}$).

According to an embodiment, the switching converter 100 comprises a control module (for example, a microcontroller) 125.

According to an embodiment, the control module 125 is configured to receive the oscillating signal $V_{OSC}$ and to provide (e.g., generate) the control signals $V_{CTRL,H}$, $V_{CTRL,L}$, $V_{CTRL,AUX}$ from the oscillating signal $V_{OSC}$.

According to an embodiment, the control module 125 is further configured to receive a voltage $V_I$ at the first input terminal of the input inductor $110_{Lin}$ (hereinafter, working voltage $V_I$), or an indication thereof, and to provide (e.g., generate) the control signals $V_{CTRL,H}$, $V_{CTRL,L}$, $V_{CTRL,AUX}$ also based on the received working voltage $V_I$.

According to an embodiment, the control module 125 is configured to perform a comparison between the working voltage at the first input terminal of the input inductor $110_{Lin}$ (as indicated by the working voltage $V_I$) and the target voltage $V_{I,TH}$. According to an embodiment, the target voltage $V_{I,TH}$ is between 0V and the input voltage $V_{IN}$. According to an embodiment, the target voltage $V_{I,TH}$ is 0V. According to an embodiment, the target voltage $V_{I,TH}$ is stored in a proper memory location of the control module 125. According to an embodiment, the target voltage $V_{I,TH}$ may be set (and/or changed) by a user.

Broadly speaking, according to an embodiment, the control module 125 is configured to switch the auxiliary switch $105_{AUX}$ from the OFF state to the ON state when the low-side switch $105_L$ is switched from the ON state to the OFF state (with the high-side switch $105_H$ in the OFF state), to switch the auxiliary switch $105_{AUX}$ from the ON state back to the OFF state when the target voltage across the input inductor $110_{Lin}$ has been set (i.e., when $14 > V_{I,TH}$), and to switch the high-side switch $105_H$ from the OFF state to the ON state when the auxiliary switch $105_{AUX}$ is switched from the ON state back to the OFF state (with the low-side switch $105_L$ still in the OFF state).

Figure 2:
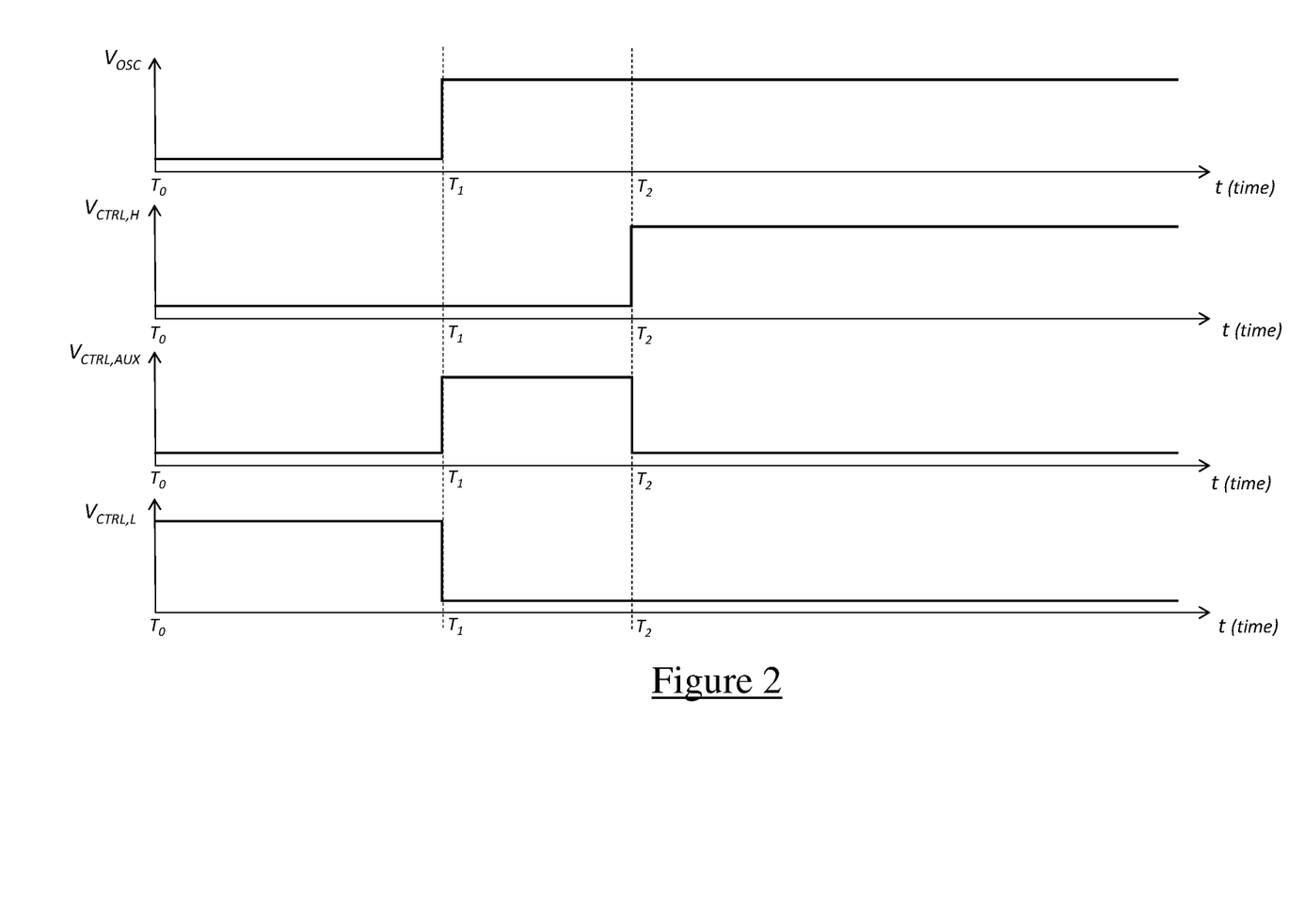
FIG. 2 shows schematic trends of control signals of the switching converter according to an embodiment of the present invention.

With joint reference to FIG. 2, it shows schematic trends of the oscillating signal $V_{OSC}$ and of the control signals $V_{CTRL,H}$, $V_{CTRL,L}$, $V_{CTRL,AUX}$ according to an embodiment of the present invention. Particularly, as visible in the figure, only the trends of the oscillating $V_{OSC}$ and control $V_{CTRL,H}$, $V_{CTRL,L}$, $V_{CTRL,AUX}$ signals relating to the switching of the low-side switch $105_L$ from the OFF state to the ON state and to the switching of the high-side switch $105_H$ from the ON state to the OFF state have been exemplary illustrated: indeed, as discussed above, this is the worst-case scenario in terms of commutation losses and power dissipation.

According to an embodiment, the control module 125 operates as follows.

When the oscillating signal $V_{OSC}$ is at the low logic level ($T_0 < t < T_1$), the control signal $V_{CTRL,L}$ is at the high logic level, and the control signals $V_{CTRL,H}$, $V_{CTRL,AUX}$ are at the low logic level. In this condition, the low-side switch 105$_L$ is in the ON state, the high-side 105$_H$ and auxiliary 105$_{AUX}$ switches are in the OFF state, and the working voltage $V_I$ is equal to the minimum working voltage $$V_{I,min}\left(\text{i.e., } V_{IN} - \frac{V_{IN}}{1-D}\right).$$

When the oscillating signal $V_{OSC}$ switches from the low logic level to the high logic level ($t=T_1$), the control signal $V_{CTRL,L}$ switches from the high logic level to the low logic level (the control signal $V_{CTRL,L}$ being thus a negated version of the control signal $V_{REF}$), the control signal $V_{CTRL,AUX}$ switches from the low logic level to the high logic level, and the control signal $V_{CTRL,H}$ is unchanged at the low logic level. In this condition, the low-side switch 105$_L$ switches from the ON state to the OFF state, the high-side 105$_H$ switch is unchanged in the OFF state, and the auxiliary switch 105$_{AUX}$ switches from the OFF state to the ON state. In this configuration, the working voltage $V_I$ progressively increases from the minimum working voltage $V_{I,min}$, due to the resonance effect between the auxiliary inductor 110$_{Laux}$ and the parasitic capacitors $C_H$, $C_L$ associated with the first and second terminals of the coupling capacitor 120$_{CC}$.

When, as a result of the comparison between the working signal $V_I$ and the target voltage $V_{I,TH}$ performed by the control module 125, the working signal $V_I$ is equal to, or higher than, the target voltage $V_{I,TH}$ ($t=T_2$), the control signal $V_{CTRL,AUX}$ switches from the high logic level to the low logic level, the control signal $V_{CTRL,H}$ switches from the low logic level to the high logic level, and the control signal $V_{CTRL,L}$ is unchanged at the low logic level. In this condition, the high-side switch 105$_H$ switches from the OFF state to the ON state, the auxiliary switch 105$_{AUX}$ switches from the ON state to the OFF state, and the low-side switch 105$_H$ is unchanged in the OFF state. In this configuration, the working voltage $V_I$ increases (essentially instantly) from the target voltage $V_{I,TH}$ to the input voltage $V_{IN}$: therefore, in the example at issue in which $V_{IN}$=boy and $V_{I,TH}$=0, the high-side switch 105$_H$ experiences a voltage drop of boy across it (instead of the voltage drop of 32.86 V as in the known switching converter), and hence a power dissipation that is significantly reduced.

As mentioned above, when the auxiliary switch 105$_{AUX}$ is in the ON state (and the low-side 105$_L$ and high-side 105$_H$ switches are in the OFF state), the working voltage $V_I$ progressively increases from the minimum working voltage $V_{I,min}$, due to the resonance effect between the auxiliary inductor 110$_{Laux}$ and the parasitic capacitors $C_H$, $C_L$.

The resonance frequency $f_r$ is given by:

$$f_r = \frac{1}{2\pi\sqrt{L_{aux}(C_H + C_L)}}$$

wherein $L_{aux}$ denotes the inductance value of the auxiliary inductor 110$_{Laux}$ and $C_H$ and $C_L$ denote the capacitance values of the parasitic capacitors $C_H$ and $C_L$, respectively.

According to an embodiment, the resonance frequency $f_r$ of the LC stage is higher, preferably much higher, than the switching frequency of the switching converter 100. In order to achieve it, the inductance value of the auxiliary inductor 110$_{Laux}$ may be much lower than the inductance value of the input inductor 110$_{Lin}$: just as an example, $L_{aux}$=20 nH, $L_{in}$=2 μH.

According to an embodiment, a ratio between the resonance frequency $f_r$ of the LC stage and the switching frequency of the switching converter 100 is at least equal to 10, or higher than it.

The present invention allows reducing the commutation losses with a limited number of active components of the system and with virtually no increase of the passive components: indeed, the only one passive component to be added (i.e., the auxiliary inductor 110$_{Laux}$) may have such a value that it can be obtained through the tracks of the printed circuit or in integrated form (in case of an integrated system).

According to an embodiment, the switching converter 100 further comprises one or more limiting stages for limiting oscillations across the LC stage (i.e., across the auxiliary inductor 110$_{Laux}$).

According to an embodiment, the limiting stage comprises a positive oscillation limiting stage for limiting positive oscillations across the LC stage (i.e., across the auxiliary inductor 110$_{Laux}$). According to an embodiment, the positive oscillation limiting stage is arranged across the high-side switch 105$_H$ and the auxiliary switch 105$_{AUX}$. According to an embodiment, the positive oscillation limiting stage comprises a diode element 130$_D$ (or other clamping element) having a cathode terminal electrically coupled (e.g., directly connected) to the first terminal of the high-side switch 105$_H$ (and, hence, to the input terminal $T_{IN}$ of the switching converter 100) and an anode terminal electrically coupled (e.g., directly connected) to the second terminal of the auxiliary switch 105$_{AUX}$ (and, hence, to the first terminal of the auxiliary inductor 110$_{Laux}$).

According to an embodiment, the limiting stage comprises a negative oscillation limiting stage for limiting negative oscillations across the LC stage (i.e., across the auxiliary inductor 110$_{Laux}$). According to an embodiment, the negative oscillation limiting stage is arranged across the auxiliary inductor 110$_{Laux}$. According to an embodiment, the negative oscillation limiting stage comprises a further switching element 135 (hereinafter, limiting switch), for example a bilateral switch, having a first terminal electrically coupled (e.g., directly connected) to the first terminal of the auxiliary inductor 110$_{Laux}$ (and, hence, to the anode terminal of the diode element 130$_D$), a second terminal electrically coupled (e.g., directly connected) to the reference terminal $T_{GND}$) and a control terminal for receiving a respective control signal $\overline{V_{CTRL,AUX}}$.

Similarly to the switches 105$_H$, 105$_L$, 105$_{AUX}$, the first and second terminals of the limiting switch 135 are electrically coupleable to each other according to a value of the control signal $\overline{V_{CTRL,AUX}}$.

According to an embodiment, depending on the value of the control signal $\overline{V_{CTRL,AUX}}$, the limiting switch 135 may take the ON state, in which the respective first and second terminals are electrically coupled to each other (thus allowing an electric current to flow across the limiting switch 135), or the OFF state, in which the respective first and second terminals are electrically decoupled to each other (thus preventing any electric current from flowing across the limiting switch 135).

According to an embodiment, the control signal $\overline{V_{CTRL,AUX}}$ is a digital signal, i.e. a signal that may take a low logic level (for example, corresponding to the reference or ground voltage) or a high logic level (for example, corresponding to a positive voltage higher than the reference voltage, such as 3.4 V).

According to an embodiment, the control signal $\overline{V_{CTRL,AUX}}$ is provided (e.g., generated) from the oscillating signal $V_{OSC}$.

According to an embodiment, the control signal $\overline{V_{CTRL,AUX}}$ is the negated version of the control signal $V_{CTRL,AUX}$, the control module 125 being for example configured to provide (e.g., generate) the control signals $V_{CTRL,H}$, $V_{CTRL,L}$, $V_{CTRL,AUX}$, $\overline{V_{CTRL,AUX}}$ from the oscillating signal $V_{OSC}$.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

In particular, similar considerations apply if the switching converter has a different structure or includes equivalent components. In any case, any component thereof may be separated into several elements, or two or more components may be combined into a single element; furthermore, each component can be replicated to support the execution of the corresponding operations in parallel. It should also be noted that (unless otherwise indicated) any interaction between different components generally does not need to be continuous, and may be either direct or indirect through one or more intermediaries.

For example, although in the foregoing explicit reference has been made to an LC stage is connected in parallel to the input stage, similar considerations apply, mutatis mutandis, by considering an LC stage (particularly, the auxiliary inductor $110_{Laux}$) connected in parallel to the output stage (particularly, between the first terminal of the output inductor $110_{Lout}$ and the reference terminal $T_{GND}$) when the auxiliary switch $105_{AUX}$ is in the ON state. In this case, the working voltage at the first input terminal of the output inductor $110_{Lout}$, or an indication thereof, may be received at the control module 125, and the control module 125 may be configured to perform a comparison between such working voltage and the target voltage provide, and to generate the control signals $V_{CTRL,H}$, $V_{CTRL,L}$, $V_{CTRL,AUX}$, $\overline{V_{CTRL,AUX}}$ based on the oscillating signal $V_{OSC}$ and on such a working voltage.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A switching converter for converting a direct current input voltage into a direct current output voltage, wherein the switching converter comprises:
   an input stage for receiving the input voltage;
   an output stage for providing the output voltage;
   a capacitive coupling stage for coupling the input stage and the output stage to each other;
   a first switching stage configured to be switched between a first state in which the input voltage is allowed to be provided to the input stage, and a second state in which the input voltage is prevented from being provided to the input stage;
   a second switching stage configured to be switched between a third state in which a reference voltage is allowed to be provided to the output stage, and a fourth state in which the reference voltage is prevented from being provided to the output stage; and
   a voltage regulation stage configured to set, after the second switching stage is switched from the third state to the fourth state and before the first switching stage is switched from the second state to the first state, a target voltage across the input stage.

2. The switching converter according to claim 1, wherein the voltage regulation stage comprises:
   an inductive-capacitive (LC) stage;
   a third switching stage configured to be switched between a fifth state in which the target voltage is allowed to be set across the input stage through the LC stage, and a sixth state in which the target voltage is prevented from being set across the input stage; and
   a control module configured to:
      with the first switching stage in the second state, switch the third switching stage from the sixth state to the fifth state when the second switching stage is switched from the third state to the fourth state;
      switch the third switching stage from the fifth state back to the sixth state when the target voltage across the input stage has been set; and
      with the second switching stage in the fourth state, switch the first switching stage from the second state to the first state when the third switching stage is switched from the fifth state back to the sixth state.

3. The switching converter according to claim 2, wherein, when the third switching stage is in the fifth state, the LC stage is connected in parallel to the input stage.

4. The switching converter according to claim 2, further comprising at least one limiting stage for limiting oscillations across the LC stage.

5. The switching converter according to claim 4, wherein the at least one limiting stage comprises, across the first switching stage and the third switching stage, a diode element for limiting positive oscillations across the LC stage.

6. The switching converter according to claim 5, wherein the at least one limiting stage further comprises:
   across the LC stage, a fourth switching stage for limiting negative oscillations across the LC stage.

7. The switching converter according to claim 2, wherein, when the third switching stage is in the fifth state, the LC stage is connected in parallel to the output stage.

8. The switching converter according to claim 1, wherein the switching converter is a zeta converter.

9. A system comprising:
   a power source configured to generate a source voltage;
   a first electronic/electro-mechanical component configured to operate at a first voltage;

a second electronic/electro-mechanical component configured to operate at a second voltage different from the first voltage;

a first switching converter configured to receive the source voltage from the power source and provide the first voltage to the first electronic/electro-mechanical component; and a second switching converter configured to receive the source voltage from the power source and provide the second voltage to the second electronic/electro-mechanical component;

each of the first and second switching converters comprising:
- an input stage for receiving the source voltage;
- an output stage for providing the first or second voltage, respectively;
- a capacitive coupling stage for coupling the input stage and the output stage to each other;
- a first switching stage configured to be switched between a first state in which the source voltage is allowed to be provided to the input stage, and a second state in which the source voltage is prevented from being provided to the input stage;
- a second switching stage configured to be switched between a third state in which a reference voltage is allowed to be provided to the output stage, and a fourth state in which the reference voltage is prevented from being provided to the output stage; and
- a voltage regulation stage configured to set, after the second switching stage is switched from the third state to the fourth state and before the first switching stage is switched from the second state to the first state, a target voltage across the input stage.

10. The system according to claim 9, wherein the voltage regulation stage of each switching converter comprises:
- an inductive-capacitive (LC) stage;
- a third switching stage configured to be switched between a fifth state in which the target voltage is allowed to be set across the input stage through the LC stage, and a sixth state in which the target voltage is prevented from being set across the input stage; and
- a control module configured to:
  - with the first switching stage in the second state, switch the third switching stage from the sixth state to the fifth state when the second switching stage is switched from the third state to the fourth state;
  - switch the third switching stage from the fifth state back to the sixth state when the target voltage across the input stage has been set; and
  - with the second switching stage in the fourth state, switch the first switching stage from the second state to the first state when the third switching stage is switched from the fifth state back to the sixth state.

11. The system according to claim 10, wherein, for each switching converter, when the third switching stage is in the fifth state, the LC stage is connected in parallel to the input stage.

12. The system according to claim 10, each switching converter further comprising at least one limiting stage for limiting oscillations across the LC stage.

13. The system according to claim 12, wherein the at least one limiting stage of each switching converter comprises, across the first switching stage and the third switching stage, a diode element for limiting positive oscillations across the LC stage.

14. The system according to claim 13, wherein the at least one limiting stage of each switching converter further comprises:
across the LC stage, a fourth switching stage for limiting negative oscillations across the LC stage.

15. The system according to claim 10, wherein, for each switching converter, when the third switching stage is in the fifth state, the LC stage is connected in parallel to the output stage.

16. The system according to claim 9, wherein the switching converters are zeta converters.

17. A method for converting, in a switching converter, a direct current input voltage into a direct current output voltage, wherein the switching converter comprises an input stage for receiving the input voltage, an output stage for providing the output voltage, a capacitive coupling stage for coupling the input stage and the output stage to each other, a first switching stage configured to be switched between a first state in which the input voltage is allowed to be provided to the input stage, and a second state in which the input voltage is prevented from being provided to the input stage, and a second switching stage configured to be switched between a third state in which a reference voltage is allowed to be provided to the output stage, and a fourth state in which the reference voltage is prevented from being provided to the output stage, the method comprising:
- switching the second switching stage from the third state to the fourth state;
- setting a target voltage across the input stage; and
- switching the first switching stage from the second state to the first state.

18. The method according to claim 17, wherein the switching converter further comprises an inductive-capacitive (LC) stage, a third switching stage configured to be switched between a fifth state in which the target voltage is allowed to be set across the input stage through the LC stage, and a sixth state in which the target voltage is prevented from being set across the input stage, and the method further comprises:
- with the first switching stage in the second state, switching the third switching stage from the sixth state to the fifth state when the second switching stage is switched from the third state to the fourth state;
- switching the third switching stage from the fifth state back to the sixth state when the target voltage across the input stage has been set; and
- with the second switching stage in the fourth state, switching the first switching stage from the second state to the first state when the third switching stage is switched from the fifth state back to the sixth state.

19. The method according to claim 18, further comprising connecting, when the third switching stage is in the fifth state, the LC stage in parallel to the input stage.

20. The method according to claim 18, further comprising limiting, by at least one limiting stage, oscillations across the LC stage.

21. The method according to claim 20, further comprising limiting, by a diode element across the first switching stage and the third switching stage, positive oscillations across the LC stage.

22. The method according to claim 21, further comprising limiting, by a fourth switching stage across the LC stage, negative oscillations across the LC stage.

23. The method according to claim 18, further comprising connecting, when the third switching stage is in the fifth state, the LC stage in parallel to the output stage.

* * * * *